United States Patent Office 3,197,311
Patented July 27, 1965

3,197,311
SALAD
Omar Dajany, Arlington, Va., assignor of one-half to Elizabeth A. Dajany, Arlington, Va.
No Drawing. Filed Nov. 21, 1961, Ser. No. 154,055
1 Claim. (Cl. 99—100)

This invention relates to creations and improvements in salads, and salad dressings, and is particularly concerned with the provision of a salad adapted to be packaged whereby it can be sold in a condition ready for serving.

Various types of food products have in recent years been packaged in so-called "ready-to-serve" form. Some of such products are frozen, others are canned, and still others are preserved in different fashions. Notwithstanding the availability of ready-to-serve meat products, ready-to-serve poultry products, ready-to-serve bakery products, and certain ready-to-serve vegetable products, there is at the present time, to my knowledge, no satisfactory completely assembled ready-to-serve salad product. Accordingly, the primary object of the present invention is to provide a "ready-to-serve" salad product formed basically from existing salad constituents, and dressing constituents in accordance herewith, whereby to provide a salad product which maintains its quality for prolonged periods.

Still a further, important, yet more specific object of the present invention is to provide such a salad which can be inexpensively produced and sold, and placed in ordinary containers so as to be available to the normal housewife.

Still a further, additional, yet important object of the present invention is to provide such a salad which possesses resistance to wilting and decay, which possesses very desirable taste qualities, which can remain refrigerated for several days, which is adapted to mass production techniques, and which, if desired, can contain available preservative agents in the event qualities are to be maintained over a prolonged period of time.

Other, still additional, and yet further objects of the present invention are: (a) to provide a salad conforming with all of the preceding objects, which comprises basically a vegetable content mixture, and a dressing content mixture; (b) to provide such a salad wherein the vegetable content mixture includes tomatoes, cucumbers, and parsley leaves; and wherein the dressing component includes lemon juice, salt, water, and crushed garlic, as well as ground hulled sesame seed mixed therewith in accordance with the techniques hereof; (c) to provide such a salad wherein the dressing constituents are mixed prior to application thereof to the vegetable content in such manner that the mixture hardens slightly and expands and is thereafter continuously stirred until it again softens and lightens in color; (d) to provide such a salad wherein the vegetable content thereof includes peeled chopped tomatoes, and peeled chopped cucumbers, as well as finely chopped fresh parsley leaves and salt; (e) to provide, aside from the overall salad itself, an improved salad dressing comprising the dressing content of the overall salad discussed above; and (f) to provide methods of making the aforesaid salad which are adapted to mass production techniques.

The invention will be better understood, and objects other than those specifically set forth above will become apparent, when consideration is given to the following detailed description of the invention.

VEGETABLE CONTENT

Table I below sets forth the vegetable content of a salad prepared in accordance with the invention.

Table I

| Proportions | Ingredients |
| --- | --- |
| 2 to 3 cups | Peeled chopped tomatoes. |
| 2 to 3 cups | Peeled chopped cucumbers. |
| ½ to 1 cup | Fresh parsley leaves, finely chopped. |
| ¼ to ½ teaspoon | Salt. |

The vegetable ingredients set forth in Table I are initially mixed thoroughly so as to provide what is commonly called a "tossed" mixture of the vegetable ingredients. While the particular proportions of the ingredients may be varied within the ranges recited in Table I, preferably two and one-half (2½) cups of peeled chopped tomatoes are used, two and one-half (2½) cups of peeled chopped cucumbers are used, three-fourths (¾) of a cup of finely chopped fresh parsley is used, and one-half (½) teaspoon of salt is used. The tomatoes may be chopped to any particular size, but preferably they are chopped into pieces having a maximum dimension of ¼ to ½" (inch). Similarly, while the cucumbers may be chopped to any reasonable size, preferably they are chopped into pieces having a maximum dimension of ¼" to ½" (inch). The parsley is finely chopped so that no particular piece thereof has a dimension over ³⁄₁₆" (³⁄₁₆ of an inch).

SALAD DRESSING

Table II below sets forth the ingredients of the salad dressing prepared in accordance with the instant invention.

Table II

| Proportions | Ingredients |
| --- | --- |
| ½ to ¾ cup | Ground hulled sesame seed. |
| ½ to ¾ cup | Fresh lemon juice. |
| ¼ to ¾ teaspoon | Salt (NaCl). |
| 1 to 2 tablespoons | Water. |
| ⅛ to ¼ teaspoon | Crushed garlic. |

Although the relative proportions of the salad dressing ingredients may be varied within the ranges set forth in Table II, preferably ¾ cup of ground hulled sesame seed is used, ¾ cup of lemon juice is used, one-half (½) teaspoon of salt is used, two (2) tablespoons of water are used, and ³⁄₁₆ cup of crushed garlic is used. The sesame seed may be ground in any conventional manner, such as for example, by grinding or pressing. The garlic is preferably crushed by hand, but any standard crushing procedure can be used so as to provide small garlic pieces having no dimension of significance.

PREPARATION

The salad dressing is prepared by mixing the various ingredients together and thoroughly stirring the same. The proportion of the sesame seed extract which is added as aforesaid, causes upon mixture of the dressing ingredients, a slight hardening and expansion thereof. With continued mixing, however, the dressing softens and lightens in color, and the invention contemplates the thorough mixture so as to obtain the softened and lighter dressing.

Once the dressing has been prepared, the same is poured over the vegetable ingredients which have previously been tossed as explained above, and the resultant body of salad and dressing is thoroughly mixed. If desired, the salad can then be packaged in any suitable container, and refrigerated. It has been found that with packaging of the salad and refrigeration, crispness and other qualities are maintained for prolonged periods of time. In fact, taste qualities are enhanced with two to three days refrigerated storage.

The salad can be frozen or canned, if desired, and if necessary for purposes of preservation for periods of a week, a month, or longer. In this instance, conventional preservatives can be added to the salad in desired amounts, depending on the quantity of the salad. Standard preservatives such as ascorbic-citric acid or sodium benzoate have been found to be satisfactory.

RELATIVE PROPORTIONS

For purposes of convenience, the relative proportions of the various ingredients of the vegetable content, as well as the dressing content of a salad prepared in accordance herewith have been set forth in terms of volume hereinabove. However, for purposes of completeness, Table III presents, for comparison purposes, relative weights of approximate values corresponding to the volumes there set forth.

*Table III*

| Proportions | Ingredients | Approximate Weight, ounces |
|---|---|---|
| 2½ cups | Peeled chopped tomatoes | 20 |
| 2½ cups | Peeled chopped cucumbers | 16½ |
| ¾ cup | Finely chopped fresh parsley leaves | 1 |
| ¼ teaspoon | Salt (NaCl) | |
| ¾ cup | Ground hulled sesame seed | 6 |
| ¾ cup | Lemon juice | 6 |
| 2 tablespoons | Water | |
| ¼ teaspoon | Crushed garlic | |

It is to be understood that the proportions listed above are given for a basic mixture. In the event the quantity is to be twice that obtained with the basic mixture set forth, then the relative ingredients would be doubled. Similarly, in the event the mixture was to be one-half of the basic mixture set forth, then the relative ingredients would be halved. Of course, as appreciated by those of ordinary skill in the art, with the basic mixture proportions, any desired quantity of salad may be prepared. Thus, the term "relative proportion" as used in this specification and the appended claim refers to the quantity of the constituents reduced by the lowest common denominator.

While an overall salad prepared in accordance herewith achieves the objects set forth at the outset of the specification, it is important to understand that the dressing provided hereby also constitutes a significant aspect of the present invention. Thus, the invention may be considered as directed to both an improved overall salad, and an improved salad dressing per se.

After reading the foregoing description, it should be apparent that the objects as outlined hereinabove have been successfully achieved, and accordingly,

What is claimed is:

A salad comprising:
(1) a mixed vegetable content including by relative proportions:
    (a) 2 to 3 cups peeled chopped tomatoes,
    (b) 2 to 3 cups peeled chopped cucumbers,
    (c) ½ to 1 cup finely chopped fresh parsley leaves,
    (d) ¼ to ½ teaspoon salt,
and
(2) a dressing consisting essentially of by relative proportions:
    (a) ½ to ¾ cup ground hulled sesame seed,
    (b) ½ to ¾ cup lemon juice,
    (c) ¼ to ¾ teaspoon salt,
    (d) 1 to 2 tablespoons water,
    (e) ⅛ to ¼ teaspoon crushed garlic.
and stirred until the dressing mixture successively hardens and slightly expands and thereafter softens and lightens in color.

References Cited by the Examiner

UNITED STATES PATENTS 1,816,338   7/31   Musher               99—163
2,910,367   10/59  Melnick et al.      99—144 XR

OTHER REFERENCES

"Everybody's Cookbook," by Lord, Revised Edition, Harcourt, Brace and Company, New York, pages 660, 661, 671 and 672. 1937.

A. LOUIS MONACELL, *Primary Examiner.*

BEATRICE H. STRIZAK, *Examiner.*